United States Patent [19]
Notenboom et al.

[11] Patent Number: 5,748,468
[45] Date of Patent: May 5, 1998

[54] PRIORITIZED CO-PROCESSOR RESOURCE MANAGER AND METHOD

[75] Inventors: Leo A. Notenboom, Woodinville; Benjamin A. Mejia, Seattle; Curtis D. Smith, Issaquah, all of Wash.

[73] Assignee: Microsoft Corporation, Redmond, Wash.

[21] Appl. No.: 434,789

[22] Filed: May 4, 1995

[51] Int. Cl.$^6$ .................................... G05B 15/00
[52] U.S. Cl. ............... 364/132; 364/240; 364/131; 395/200.01; 395/200.05; 395/200.09; 395/290; 395/614; 395/650; 395/673; 395/674; 395/675; 395/730; 395/775; 395/800; 395/807; 395/868; 326/37; 455/341
[58] Field of Search .................. 364/132, 240, 364/131; 395/775, 650, 200.05, 290, 674, 673, 675, 614, 730, 800, 807, 868, 200, 200.09, 200.01; 326/37; 455/34.1

[56] References Cited

U.S. PATENT DOCUMENTS

| | | | |
|---|---|---|---|
| 3,916,383 | 10/1970 | Malcolm | 395/674 |
| 4,642,756 | 2/1987 | Sherrod | 395/673 |
| 4,949,247 | 8/1990 | Stephenson et al. | 395/800 |
| 5,016,162 | 5/1991 | Epstein et al. | 395/730 |
| 5,038,282 | 8/1991 | Gilbert et al. | 395/200.01 |
| 5,060,140 | 10/1991 | Brown et al. | 395/285 |
| 5,192,882 | 3/1993 | Lipovski | 326/37 |
| 5,257,374 | 10/1993 | Hammer et al. | 395/675 |
| 5,313,630 | 5/1994 | Namioka et al. | 395/614 |
| 5,442,791 | 8/1995 | Wrabetz | 395/650 |
| 5,487,167 | 1/1996 | Dinallo et al. | 395/307 |
| 5,526,492 | 6/1996 | Ishida | 395/200.09 |
| 5,537,684 | 7/1996 | Cassidy et al. | 455/34.1 |
| 5,566,352 | 10/1996 | Wishneusky | 395/868 |

OTHER PUBLICATIONS

Windows Becomes DSP–Aware, Andrew W. Davis, Byte Magazine, pp. 4–5, 151–162, Nov., 1994.
Three DSP RTOSs Are Ready to Merge with Windows, David Shear, EDN, pp. 29–34, Jun. 23, 1994.
IBM Announces MWave V.34 Solution, IBM Microelectronics, Mar. 6, 1995.
AT&T Upgrades VCOS Operating System for Multimedia Applications, the Internet, Aug. 23, 1993.
Press release, the Internet, Oct 11, 1990.
DSP Chips Enable PC Multimedia, MicroDesign Resources, Inc., Microprocessor Report, vol. 8 No. 11, Aug. 22, 1994.
Electro '94—Managing DSPs for Chicago & Others, Newsbytes Inc., Newsbytes, May 18, 1994.
AT&T Micro, DSP Group Sign TrueSpeech Accord, Electronic News, Aug. 22, 1994.
IBM Touts Mwave DSP for Multimedia Introduces Mwave–based Digital Signal Processor, Electronic Engineering Times, Jun. 6, 1994.
IBM Microelectronics has Signal Processing Device, Newsbytes, Oct. 12, 1993.
IBM Encourages OEMs to Catch its *Mwave*, PC Week, vol. 10, No. 42, p.23, Oct. 25, 1993.

(List continued on next page.)

Primary Examiner—Reba I. Elmore
Assistant Examiner—McDieunel Marc
Attorney, Agent, or Firm—Klarquist Sparkman Campbell Leigh & Whinston, LLP

[57] ABSTRACT

A co-processor resource manager allocates resources of a co-processor platform to nodes implementing operations requested by applications running on a host processor according to a user-modifiable prioritization of the operations. Lower priority nodes can be evicted by the manager to resolve resource conflicts for newly requested operations. The manager utilizes a query test for the platform driver or client to override eviction or prevent eviction by downgrading an operation's resource usage. A platform driver tracks resource usage of nodes, and classifies resources as singly allocatable or countable types to maintain co-processor resource manager independence from the co-processor platform.

21 Claims, 8 Drawing Sheets

OTHER PUBLICATIONS

Multimedia Moves to the Motherboard, Datamation, vol. 38, No. 20, p.57, Oct. 1, 1992.

Multimedia Computing: IBM, Texas Instruments, Intermetrics Announce Alliance, Disclose *Mwave* Subsystem as Open Platform for Multimedia Computing, EDGE: Work-Group Computing Report, vol. 3, No. 95, p. 19, Mar. 16, 1992.

A Dynamically Configured V.32bis Automode Modem on the Mwave System, Proceedings of the Fourth International Conference on Signal Processing Applications and Technology, p. 235–8, vol. 1, Sep., 28—Oct. 1, 1993.

AT&T Focuses on PC/telecom Niche in '95, Computer Retail Week, vol. 5, No. 85, p. 10, Jan. 2, 1995.

Signal Processing for Multimedia, Byte, vol. 17, No. 2, p. 105, Feb., 1992.

Designers Eye DSP Operating Systems: Users Like That They Ease Development Tasks, But Seek Some Improvements, Electronic Engineering Times, No. 629, p. 41, Feb. 18, 1991.

VCOS in Operation, Electronic Times, p. 19, Aug. 11, 1994.

The Mwave Operating System: Support for Hard Real-Time Multitasking, Elizabeth A. Hinzelman–Fortino, Donald E. Carmon, IBM Corporation, not dated.

Integrating Digital Signal Processing into Personal Computers, IBM Corporation, May, 1994.

The Mwave Technology Platform: Vitual Signal Processing, Michael T. Vanover, Electro International, May 10–12, 1994.

PRIORITIZED CO-PROCESSOR RESOURCE MANAGER AND METHOD

FIELD OF THE INVENTION

This invention generally relates to co-processor resource management, and, more particularly, relates to a host-processor controlled co-processor resource manager in a multi-tasking environment.

BACKGROUND OF THE INVENTION

Computers generally include a central processor for executing program tasks. Many computers additionally include a co-processor which is controlled by the central processor, and which the central processor can assign or "offload" some processing functions or tasks to execute. (In computers having multiple processors, a processor (generally the central processor) which has control over other processors (e.g. its co-processors) is referred to as the host processor. The controlled processors are referred to as slave processors.) For example, some computers include a floating-point co-processor to which floating-point operations are offloaded by the central processor. This frees the central processor to continue with other program tasks while the co-processor completes the offloaded processing functions. Typically (although not necessarily), the co-processor also is especially adapted or optimized for executing the offloaded processing functions. With this arrangement, the central processor is able to perform its program tasks more efficiently.

The ability of the host processor to assign processing tasks to co-processors can vary greatly. Some co-processors, for example, are single-use, dedicated co-processors which can only be directed to perform one dedicated processing task. Examples of "dedicated use" co-processors are the digital signal processors (DSPs) utilized in some sound cards and modems which are permanently allocated to performing audio and telephony functions, respectively, in these computer accessories. DSPs are microprocessors which are optimized for processing digitized analog signals, including sound (both audio and telephony) and video signals. Dedicated-use co-processors typically are hard-wired or ROM-based, which prevents the host processor from allocating the co-processor to other operations to which the co-processor could otherwise be adapted.

General purpose, programmable co-processors also are available. Programmable co-processors generally are RAM-based, which allows the co-processor to load and execute various different processing tasks offloaded by the host processor. Some programmable co-processors, herein referred to as single-tasking, are limited to performing one processing task at a time. In other programmable co-processors, a multi-tasking operating system is provided on the co-processor which can load multiple processing tasks and execute them concurrently by alternating execution of the processing tasks in successive time slices. Multi-tasking co-processors are particularly useful where a multi-tasking environment is employed on the host processor. The multi-tasking co-processor can then carry out several operations simultaneously, servicing multiple concurrent client processes executing on the host processor.

The various types of co-processors described above vary in the manner in which they can be allocated to executing processing tasks. Dedicated co-processors can not be allocated to any other than their dedicated processing tasks. In computers with single-tasking co-processors, the co-processor can only be allocated in its entirety to one processing task at a time. In computers with multi-tasking co-processors, portions of the resources (e.g. memory, processing cycles, input/output ports and other devices) provided by the co-processor can be allocated to different, concurrently executing processing tasks.

The host processor's allocation of a co-processor to perform assigned processing tasks is herein referred to as resource management. In prior computers, resource management of co-processors by a host processor generally has taken one of three forms. With a first form referred to herein as "dedicated use" resource management, the co-processor is permanently allocated to a single processing task. The DSP co-processors on sound cards and modems which are each dedicated exclusively to one processing task are examples of this form of resource management. Since each dedicated use co-processor is permanently allocated to a single task, no host processor resource management is actually performed. Rather, computer code that "allocates" a dedicated use co-processor to its task is typically burned into its read-only memory (ROM) chip.

Another form of co-processor resource management utilized in some prior computers is referred to herein as "most recent request." Most recent request resource management is most often utilized with programmable, single-tasking co-processors, but also is applicable to multi-tasking co-processors. With most recent request resource management, the co-processor is allocated to performing the most recently requested processing task, even when it is necessary to supplant a previously allocated processing task. On a single-tasking co-processor with this form of resource management, previously allocated processing tasks are summarily terminated each time the co-processor is allocated to a new processing task. On multi-tasking co-processors, previously allocated processing tasks are evicted only when they conflict with the allocation to the new processing task. In either case, with most recent request resource management, the co-processor is always allocated to each newly requested processing task.

A third form of co-processor resource management typical of multi-tasking co-processors is referred to herein as "first-come-first-served." With this form of resource management, each processing task is allowed to run until completion. Allocations of the co-processor to new processing tasks which would conflict with any processing tasks currently being executed on the co-processor are simply failed or suspended until their turn. With a single-tasking co-processor for example, any new processing tasks issued while another processing task is executing must wait until the co-processor completes the already executing processing task.

A drawback to previous forms of co-processor resource management is that the co-processor can be tied up executing processing tasks that are of less significance to the user. When most recent request resource management is utilized in a multi-processing host environment, for example, sensitive processing tasks can be supplanted without regard to their importance to the user. When first-come-first-served resource management is applied, processing tasks of high importance may be delayed indefinitely waiting for less significant processing tasks to complete. Multi-tasking host systems are particularly prone to conflicts between processing tasks. Several client processes or applications on the host processor may simultaneously offload processing tasks to a co-processor, thereby exceeding its capacity. Further, some processing tasks, such as digital signal processing, must occur in "real-time," so performance degradation is unacceptable.

One object of the invention therefore is to allow the user some control over the operations performed by co-processors.

A further object of the invention is to provide co-processor resource management where a host system can appropriately control the tasks being carried out on a co-processor so as to maximize the amount of computation and functionality being provided by the co-processor without compromising the user's priorities, and thus maximize the overall performance and functionality of the system.

SUMMARY OF THE INVENTION

The present invention provides a co-processor resource manager and method by which co-processor resources are allocated to processing tasks according to user set priorities. In a preferred embodiment of the invention, the co-processor resource manager communicates with a plurality of device drivers that provide services to applications or processes executing on a host processor, and with a platform driver that controls loading and execution of processing tasks by a co-processing platform which may consist of one or more co-processors. The co-processor resource manager is utilized by device drivers to dynamically load and execute processing tasks on the co-processing platform.

On an application's request to a device driver for an operation performable on the co-processing platform, the device driver issues a request to load and execute a group of one or more processing tasks to perform the operation on the co-processing platform. In its request to load and execute the group of processing tasks, the device driver associates each requested processing task of the group with a service class for the application-requested operation. Based on their service classes, the co-processor resource manager allocates co-processing resources for processing tasks to be loaded and executed by the platform driver. If co-processing resources for the requested group of processing tasks are previously allocated to currently executing processing tasks, the co-processor resource manager can elect to terminate one or more processing tasks of lower priority to thereby free sufficient resources for the requested group of processing tasks.

According to one aspect of the invention, co-processor resources are classified by the platform driver as being either singly allocatable resources or countable resources. Singly allocatable resources are allocated only in their entirety to a processing task. By contrast, countable resources can be allocated, in part, to each of plural processing tasks. The co-processor resource manager can allocate resources to processing tasks without regard to other characteristics of the resources.

According to a further aspect of the invention, a user interface control is provided with which the user can rank the service classes in a desired order of priority. The co-processor resource manager then prioritizes resource allocation to processing tasks according to user preferences.

According to yet another aspect of the invention, before processing tasks are terminated, the co-processor resource manager queries the device driver and co-processing platform for permission to evict a processing task. When permission to evict is denied, the co-processor resource manager excludes the processing task from eviction. The co-processor resource manager can thus avoid terminating any operations which cannot be interrupted. Further, the device driver or platform driver can respond to the query by reducing resource usage of the processing task, and re-attempting resource allocation.

Additional features and advantages of the invention will be made apparent from the following detailed description of a preferred embodiment which proceeds with reference to the accompanying drawings.

DETAILED DESCRIPTION OF THE PREFERRED EMBODIMENTS

Figure 1:
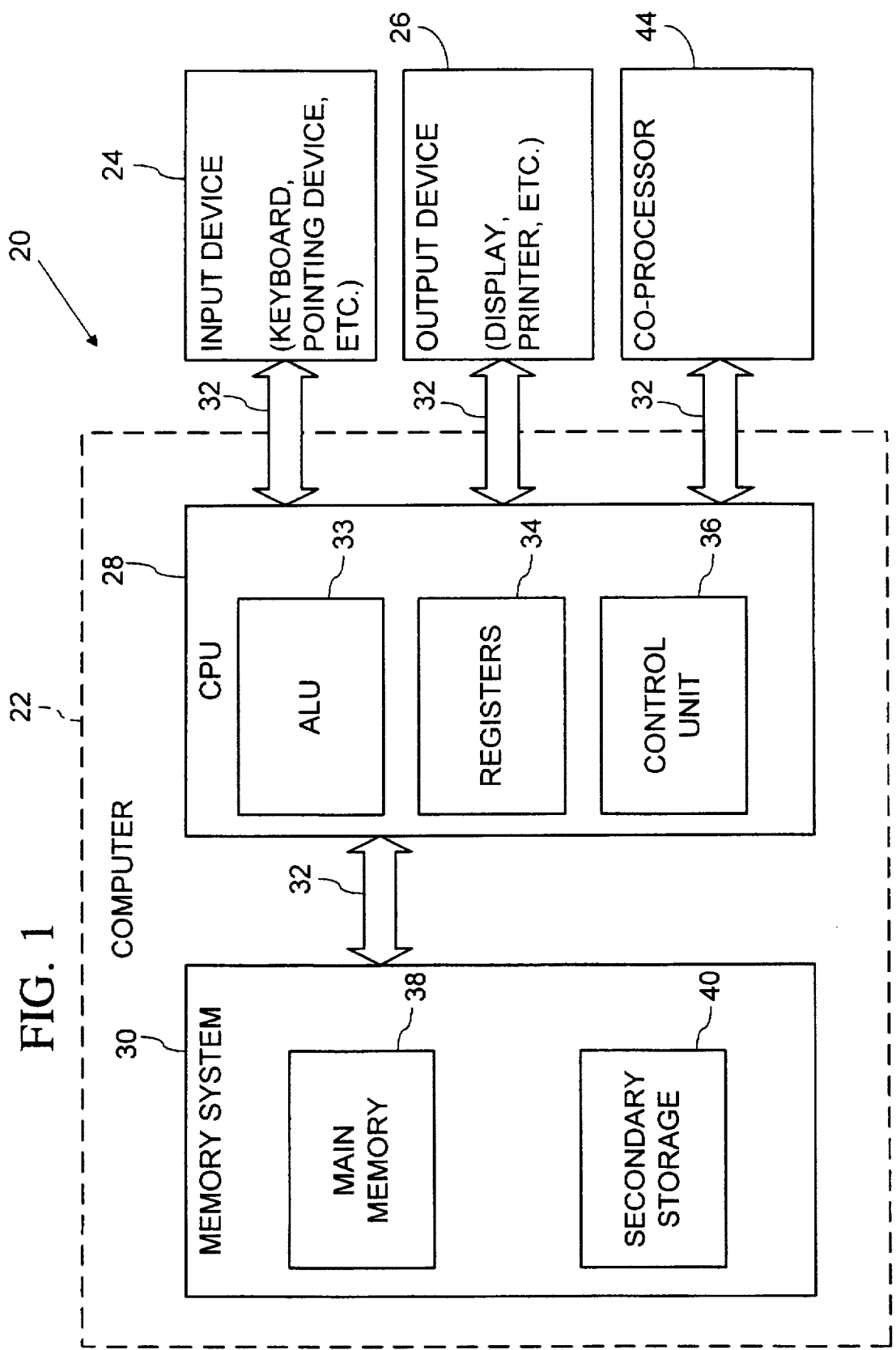
FIG. 1 is a block diagram of a computer system having a co-processor that may be used to implement a method and apparatus embodying the invention for co-processor resource management.

FIG. 1 is a block diagram of a computer system 20 which is used to implement a method and apparatus embodying the invention. Computer system 20 includes as its basic elements a computer 22, input device 24 and output device 26.

Computer 22 generally includes a central processing unit (CPU) 28 and a memory system 30 that communicate through a bus structure 32. CPU 28 acts a host processor of computer system 20. Host CPU 28 includes an arithmetic logic unit (ALU) 33 for performing computations, registers 34 for temporary storage of data and instructions and a control unit 36 for controlling the operation of computer system 20 in response to instructions from a computer program such as an application or an operating system.

Memory system 30 generally includes high-speed main memory 38 in the form of a medium such as random access memory (RAM) and read only memory (ROM) semiconductor devices and secondary storage 40 in the form of a medium such as floppy disks, hard disks, tape, CD-ROM, etc. and other devices that use optical or magnetic recording material. Main memory 38 stores programs such as a computer's operating system and currently running application programs. Main memory 38 also includes video display memory for displaying images through a display device.

Input device 24 and output device 26 are typically peripheral devices connected by bus structure 32 to computer 22. Input device 24 may be a keyboard, modem, pointing device, pen, or other device for providing input data to the computer. Output device 26 may be a display device, printer, sound device or other device for providing output data from the computer.

Computer system 20 also includes a co-processor 44. In the preferred embodiment of the invention, co-processor 44 is a RAM-based, programmable digital signal processor (DSP) having a multi-tasking co-processor operating system for concurrently performing multiple processing tasks such as that in an exemplary DSP co-processor adapter 50 described below with reference to FIG. 2. Co-processor 44 also connects to the host CPU 28 through bus structure 32. In some embodiments of the invention, computer system 20 can include multiple co-processors, each of which is managed according to the invention. For example, computer system 20 may include separate DSP co-processors for video and audio operations.

It should be understood that FIG. 1 is a block diagram illustrating the basic elements of a general purpose computer system; the figure is not intended to illustrate a specific architecture for a computer system 20. For example, no particular bus structure is shown because various bus structures known in the field of computer design may be used to interconnect the elements of the computer system in a number of ways, as desired. Host CPU 28 may be comprised of a discrete ALU 33, registers 34 and control unit 36 or may be a single device in which these parts of host CPU 28 are integrated together, such as in a microprocessor. Moreover, the number and arrangement of the elements of the computer system may be varied from what is shown and described in ways known in the art (i.e., multiple CPUs, client-server systems, computer networking, etc.).

DSP Co-processor Hardware

Figure 2:
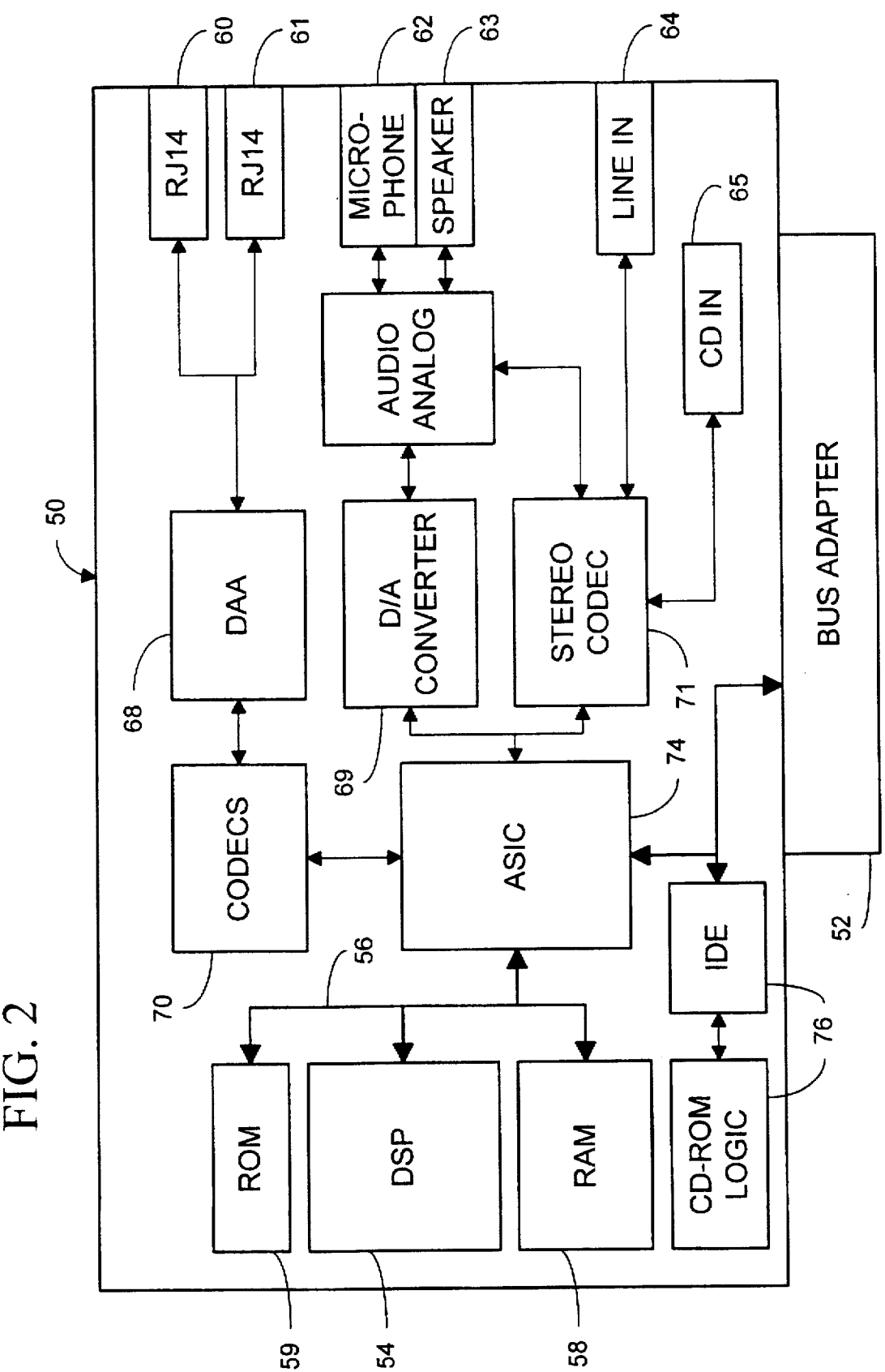
FIG. 2 is a block diagram of an exemplary programmable DSP adapter useable as a co-processor in the computer system shown in FIG. 1.

FIG. 2 is a block diagram of an illustrative implementation of a co-processor adapter card 50 suitable for use as co-processor 44 in computer system 20 of FIG. 1. Co-processor adapter card 50 is a printed circuit board card having a bus adapter 52 along one edge for connection to bus structure 32 (FIG. 1). In the illustrated exemplary implementation, co-processor adapter card 50 includes a DSP 54 connected by a DSP local bus 56 to a static RAM memory 58 and a ROM memory 59. RAM memory 58 can be loaded with code and data for processing tasks to be executed by DSP 54. ROM memory 59 stores a wave table for audio synthesis. Co-processor adapter card 50 also includes a number of connectors 60-65 for coupling to devices that are sources and/or destinations of analog signals including, for example, a telephone, a telephone system wall jack, a microphone, a speaker, an audio line input, and a CD audio input. DSP 54 is coupled to these connectors through digital/analog converters 68-69, codecs 70-71, and an application specific integrated circuit ("ASIC") 74 which interfaces to DSP local bus 56. Processing tasks can thus be loaded into RAM memory 58 for DSP 54 to process signals received from or transmitted to the analog signal source and destination devices at connectors 60-65. ASIC 74 also provides circuitry to interface with bus structure 32 (FIG. 1) such as input/output ports and other bus management circuitry (not shown). Additional storage is provided by circuitry 76 for connecting to a CD-ROM drive (not shown).

Definitions

The following definitions are relevant to the description of the co-processor resource manager and method which follows.

The term "operation" in the description which follows refers to functions carried out by co-processor 44 (FIG. 1). Examples of operations include playing a wave file, implementing a modem, and rendering a font, among many others.

The term "node," as used herein, refers to entities which are logically interconnected by data transfer to perform or implement operations. Nodes generally include processing tasks executable on co-processor 44 which implement operations, as well as host and co-processor devices (i.e. codecs 70, 71, connectors 60-64, input/output ports of ASIC 74, etc.) which constitute sources or destinations of data used in operations. A "group" of logically interconnected nodes also constitutes a node, which is herein referred to as a "group node." Nodes generally are re-useable, and may be assigned in various combinations to implement different operations.

Figure 3:
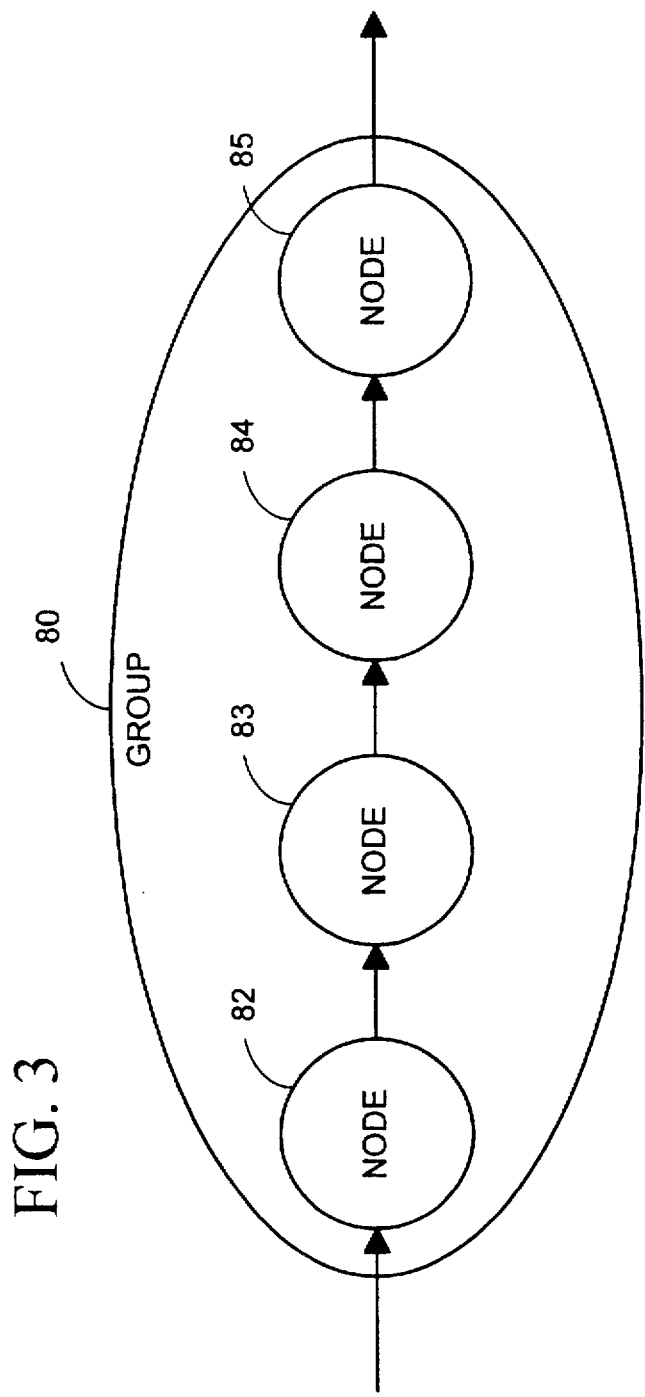
FIG. 3 is a data flow diagram of a group of nodes for implementing a modem operation on a programmable DSP co-processor, such as shown in FIG. 2.

FIG. 3, for example, shows an illustrative group 80 of nodes for performing a modem operation which includes four nodes 82-85. In the example, node 82 represents a data source from the host CPU 28. Node 83 represents a processing task on co-processor 44 which compresses data from node 82. Node 84 represents a second processing task that does error correction/detection of the compressed data. Node 85 represents audio modulation and conversion to an analog signal in codec 70 (FIG. 2) and analog/digital converter 68, which is then transmitted on a phone line attached at connector 61.

The term "resource" refers to hardware devices of co-processor 44 which are utilized by nodes to perform operations. In general, use by a node consumes resources for the duration of the use, meaning that resources in use by one node cannot also be used by another. Resources primarily include processing capacity (processor time), memory and input/output devices. For example, resources of the exemplary DSP adapter 50 described above include, among others, data storage of RAM memory 58, processing capacity of DSP 54, input/output ports of ASIC 74, codecs 70-71, analog/digital converters 68-69, and analog signal source and destination devices attached at connectors 60-65.

The term "service class" refers to a user-visible identification of the types or classes of operations performable on co-processor 44. A plurality of service classes are predefined in the preferred embodiment, including among others, "telephony," "modem," "games," "general purpose audio," and "computational assistance." These service classes are ranked, by default or by the user, in order of priority. The service classes can be ranked in a desired priority order by the user with a user interface control, such as a control panel application through which the user adjusts parameters of a host operating system. The user thus is able to designate that particular operations are to take precedence over others.

Co-processor Resource Management System Architecture

Figure 4:
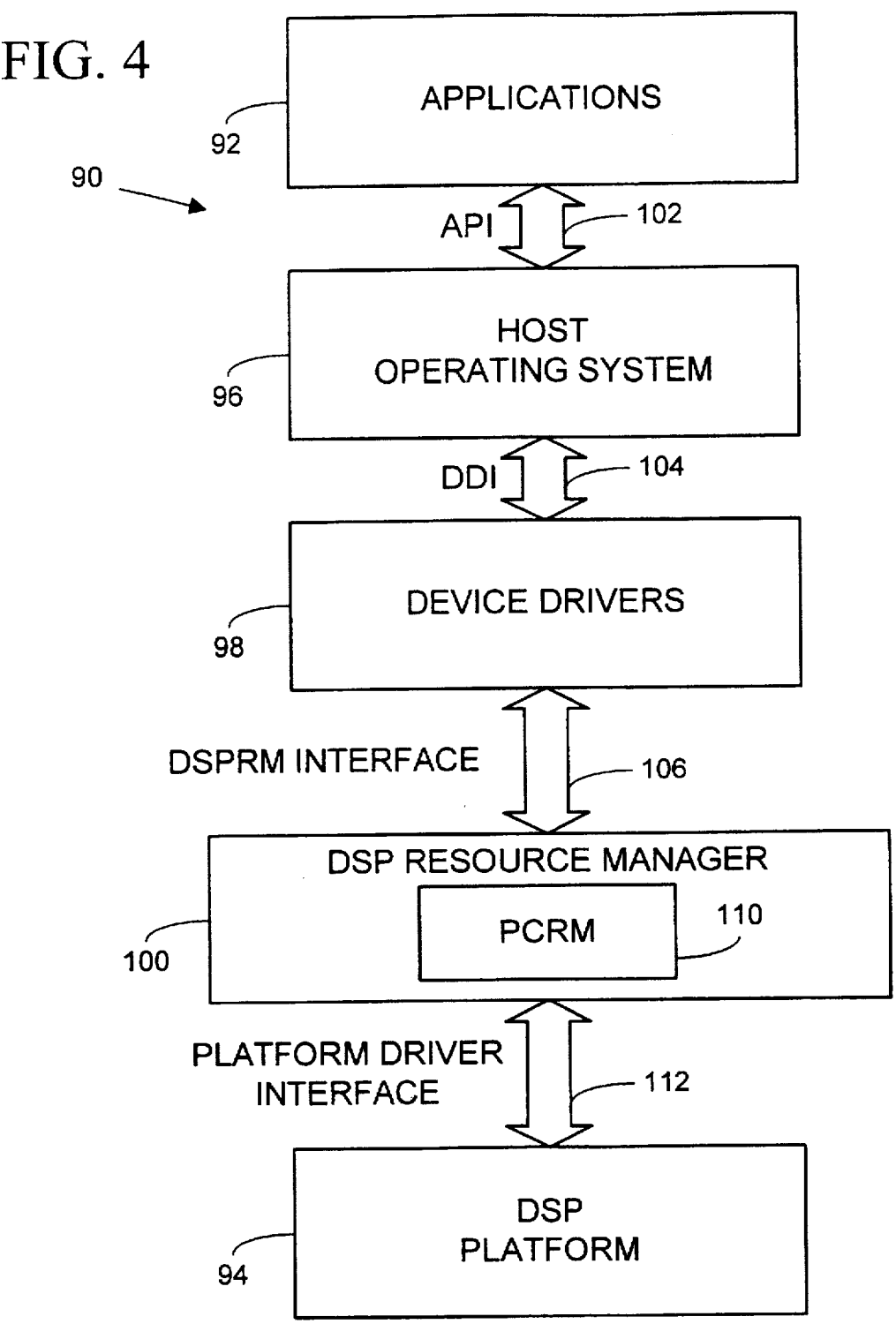
FIG. 4 is a block diagram of application programs, an operating system, device drivers, a DSP co-processor resource manager, and a DSP co-processor platform within a computer system such as shown in FIG. 1.

FIG. 4 is a block diagram of an architecture 90 for co-processor resource management on computer system 20 (FIG. 1) according to a preferred embodiment of the invention which makes use of a DSP co-processor such as that illustrated in FIG. 2. Architecture 90 comprises one or more applications 92 running on host CPU 28 as a top layer, and a DSP platform 94 as a bottom layer. Intermediate applications 92 and DSP platform 94 are a host operating system 96, device drivers 98, and a DSP resource manager ("DSPRM") 100. Requests by applications 92 for operations performable by co-processor 44 (FIG. 1) are passed through the intermediate layers of architecture 90 to DSP platform 94 at the lowest layer which carries out the operations. This layered structure provides signal processing services to upper layer applications and device drivers while making the low-level DSP-hardware details invisible to the highest layer software applications.

In architecture 90, host operating system 96 provides a number of application programming interfaces ("APIs") 102 which are callable by applications 92 to request operations. Applications 92 include software such as word processors, spreadsheets, communications programs, multi-media viewers, and many others. Host operating system 96 preferably is a multi-tasking operating system, such as Microsoft Corporation's Windows operating system, which runs one or more applications 92 concurrently. APIs 102 provide standardized, hardware-independent interfaces for applications 92 to access operations performed by hardware devices. Host operating system 96 in the preferred embodiment where co-processor 44 is a DSP, for example, provides a telephony API which supports telephony device operations, a wave API which controls wave form input/output operations for speech and music applications, a communications API which supports fax and modem operations, a multimedia API which supports audio and video operations, and a games API which provides sound support operations (e.g. sound card emulation), among others.

Host operating system 96 includes code in the form of dynamic link libraries ("DLLs") which respond to the API calls, and pass the applications' requests for operations to device drivers 98 for the respective operations through device driver interfaces ("DDIs") 104. Device drivers 98 form a software layer specific to the co-processor hardware (e.g. co-processor adapter card 50 of FIG. 2). Device drivers 98 respond to an application's request for an operation performable on co-processor 44 by requesting that a group of one or more nodes which implement the operation be loaded and executed by co-processor platform 94. Device drivers 98 issue requests to load and execute nodes through an interface 96 to DSPRM 100.

In each request to load and execute a node, device drivers 98 assign three attributes—a service class, a real time tag, and an evictable tag—which are associated with that instance of the node for the duration of its execution on co-processor 44. The service class attribute identifies the service class of the operation which the node is being loaded to implement. The real time tag attribute indicates whether the node performs real time processing, and identifies the node as either "real time" or "not real time." The evictable tag attribute identifies the node as being either "evictable" or "not evictable," indicating whether the node can be terminated to free resources for higher priority nodes or whether the node must be allowed to run to completion, respectively. As nodes may be loaded to implement various operations on co-processor 44, the attributes associated with a node, including its service class, may vary between each instance of the node. For example, one instance of a decompression node may be loaded to implement a general purpose audio operation, while a later instance of the same decompression node may be loaded to implement a game operation.

Group nodes take on the most restrictive attribute of any of their component nodes. More specifically, a group node has the service class of its component node with the highest priority service class. Also, if any of its component nodes is evictable or real time, a group node also is evictable or real time, respectively.

In DSPRM 100, a prioritized co-processor resource manager (PCRM) 110 is responsible for managing allocation of resources responsive to the device drivers' requests to load and execute nodes. PCRM 110 utilizes the three attributes assigned to the nodes by device drivers 88 in prioritizing resource allocation to the nodes. DSPRM 100 also communicates with DSP platform 94 via a platform driver interface 112. From DSP platform 94, PCRM 110 obtains data relating to the availability of resources for allocation to nodes, and the resource requirements of a particular node for use in managing resource allocations to the nodes. PCRM 110 also instructs DSP platform 94 when nodes are to be loaded or terminated according to its management of the resources.

Figure 5:
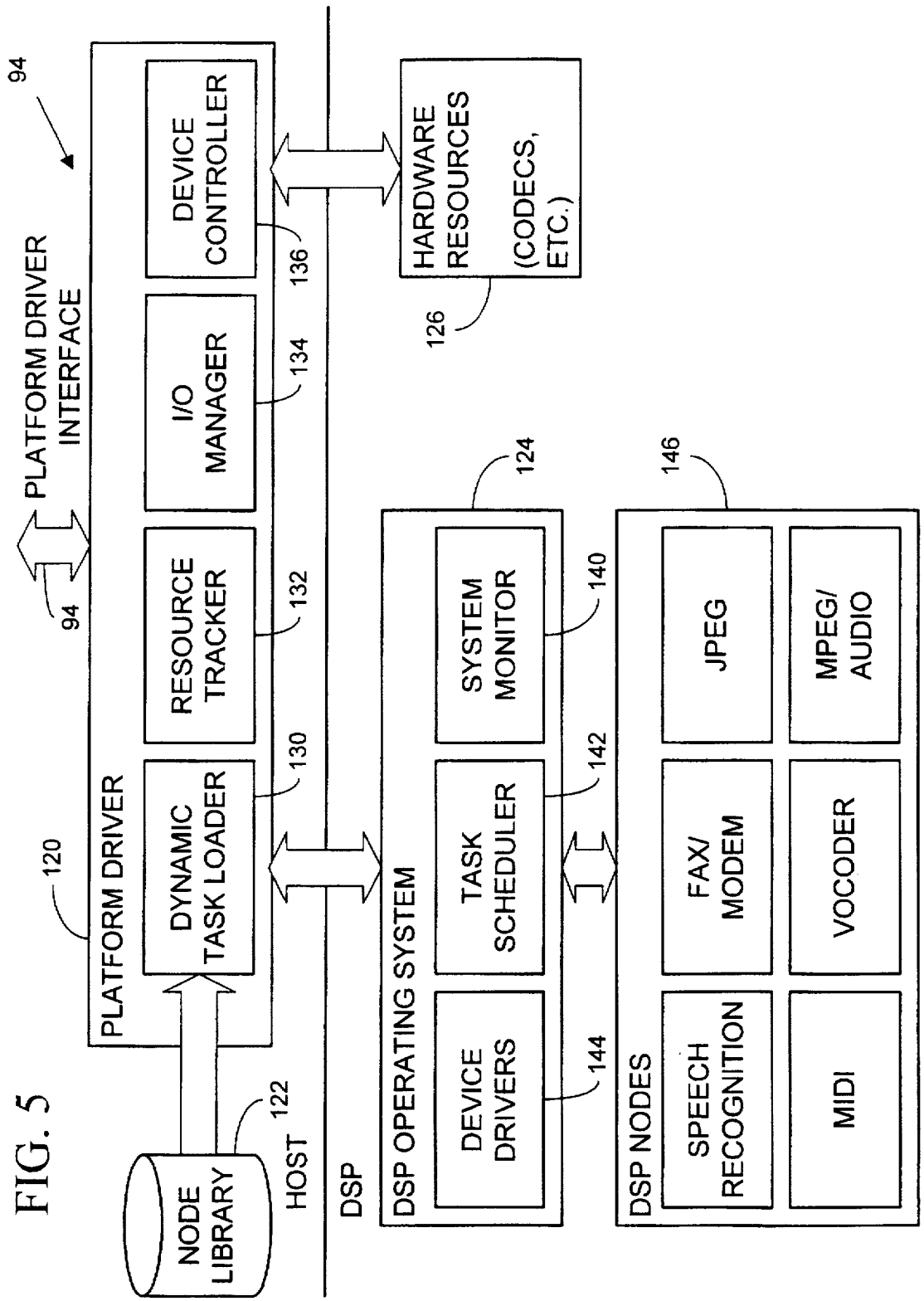
FIG. 5 is a block diagram of the DSP co-processor platform of FIG. 4.

With reference to FIG. 5, DSP platform 94 comprises a platform driver 120 that manages interaction with co-processor 44 for DSPRM 100. In alternative embodiments of the invention in which computer system 20 (FIG. 1) includes multiple co-processors 44, more than one platform driver may be utilized. In still other alternative embodiments, platform driver 120 can be adapted to manage interaction with multiple co-processors of computer system 20.

As described above, platform driver 120 communicates with DSPRM 100 through platform driver interface 112. Through interface 112, platform driver 120 provides services to DSPRM 100 relating to data stream input/output and message input/output (event notifications) between host CPU 28 (FIG. 1) and co-processor 44 (FIG. 1), as well as services for node control (i.e. loading and termination of nodes on co-processor 44). Platform driver 120 additionally communicates with a node library 122, DSP operating system 124, and DSP hardware resources 126.

Node library 122 in the preferred embodiment is a database for storing information relating to nodes that can be loaded and executed on co-processor 44. This information includes the resource requirements of nodes, as well as images (i.e. a module of code and data) for nodes which constitute processing tasks executable on DSP 54. When platform driver 120 is directed to load a node which is a processing task by PCRM 110, the node's image is transferred by dynamic task loader 130 from node library 122 to DSP operating system 124. Node library 122 preferably is stored in the computer system's secondary storage 40 (FIG. 1) such as on a hard disk.

DSP operating system 124 executes on DSP 54 (FIG. 2) and controls its system functions. In the preferred embodiment, DSP operating system 124 comprises a system monitor 140, a task scheduler 142, and DSP device drivers 144. DSP operating system 124 preferably has the ability to run multiple nodes 146 on DSP 54 at a time, as well as providing real-time scheduling of nodes 146. Accordingly, task scheduler 142 preferably is a multi-tasking, real time scheduler. Task scheduler 142 may suitably be implemented as a priority-based scheduler, a frame-based scheduler, or a deadline scheduler. DSP device drivers 144 provide input/output services for nodes 146.

Platform driver 120 preferably includes as components a dynamic task loader 130, a resource tracker 132, an input/output manager 134, and a device controller 136. Dynamic task loader 130 controls loading and eviction of node processing tasks on DSP co-processor 54 by DSP operating system 124. Input/output manager 134 controls data input/output between host CPU 28 (FIG. 1) and co-processor 44 (FIG. 1). Device controller 136 controls DSP hardware resources 126, such as codecs 70–71, analog/digital converters 68–69, etc. With dynamic task loader 130, input/output manager 134, and device controller 136, platform driver 120 can load or evict any node on co-processor 44 as directed by PCRM 110. Resource tracker 132 in platform driver 120 tracks resource availability and their utilization by nodes. With resource tracker 132, platform driver 120 can inform PCRM 110 which resources are available.

In the preferred embodiment of the invention, platform driver 120 informs PCRM 110 of resource availability and node resource requirements by passing a resource data structure in which resources are abstractly represented as one of two types, singly allocatable and countable resources. Singly allocatable resources are those that can only be allocated in their entirety to a node. Input/output devices of co-processor 44 including codecs 70–71 (FIG. 2), and analog/digital converters 68–69 (FIG. 2), are examples of singly allocatable resources. Countable resources are those that can be allocated in part up to some fixed limit, and include, for example, data storage in memory 58 (FIG. 2) and processing capacity of DSP 54 (FIG. 2). Representing resources in this manner serves to maintain hardware device independence of DSPRM 100. DSPRM 100 can be adapted to operate with any DSP platform implemented with various different hardware devices by providing a corresponding platform driver.

The resource data structure in the preferred embodiment has the following format (in a pseudo-C programming language syntax):

```
struct {
    DWORD cSingle;           //size of rgSingle
    DWORD cCountable;        //size of rgCountable
    DWORD rgSingle[ ];       //array of DWORDS of flags
    DWORD rgCountable[ ];    //array of DWORDS of counts
}
```

Each element of the array rgSingle contains a 32-bit double word value, each bit of which is a flag indicating that a particular singly allocatable resource is available (in a resource data structure having resource availability information) or required (in a resource data structure representing a node's resource requirements). The array rgCountable also contains a plurality of 32-bit double word value in each of its elements. Each double word value in the rgCountable array equates to a countable resource, with the value of the double word indicating the amount of the resource either available or required. The specific resources represented in the structure is known to platform driver 120. PCRM 110, however, can make allocations by comparing information from two resource data structures, one representing the resource requirements of a node and the second representing resource availability, without further details of the actual devices being represented.

Prioritized Co-processor Resource Management Method

Figure 6A:
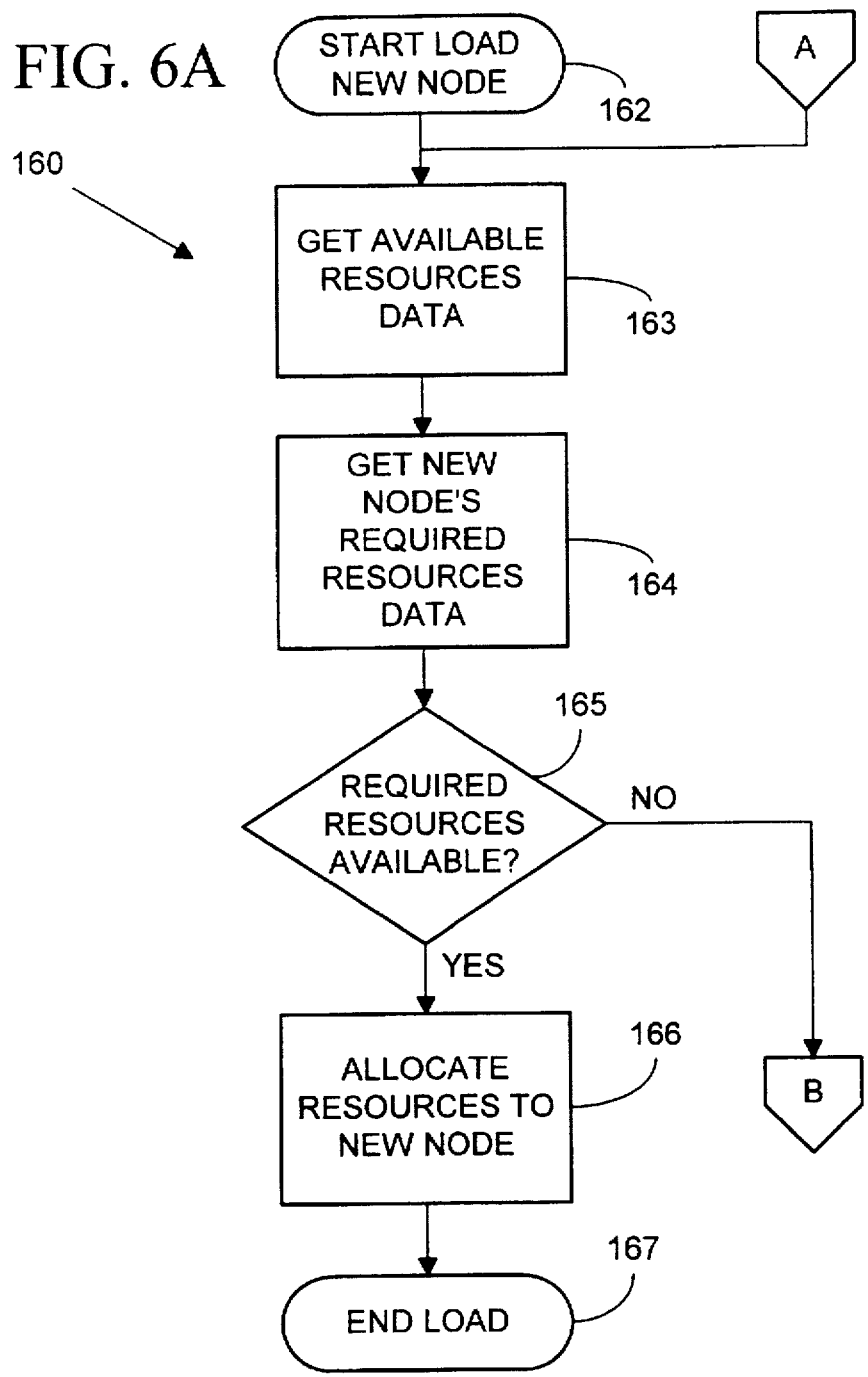
FIGS. 6A, 6B, and 6C are a flow chart of a DSP co-processor resource management method utilized by the DSP co-processor resource manager of FIG. 4.
Figure 6B:
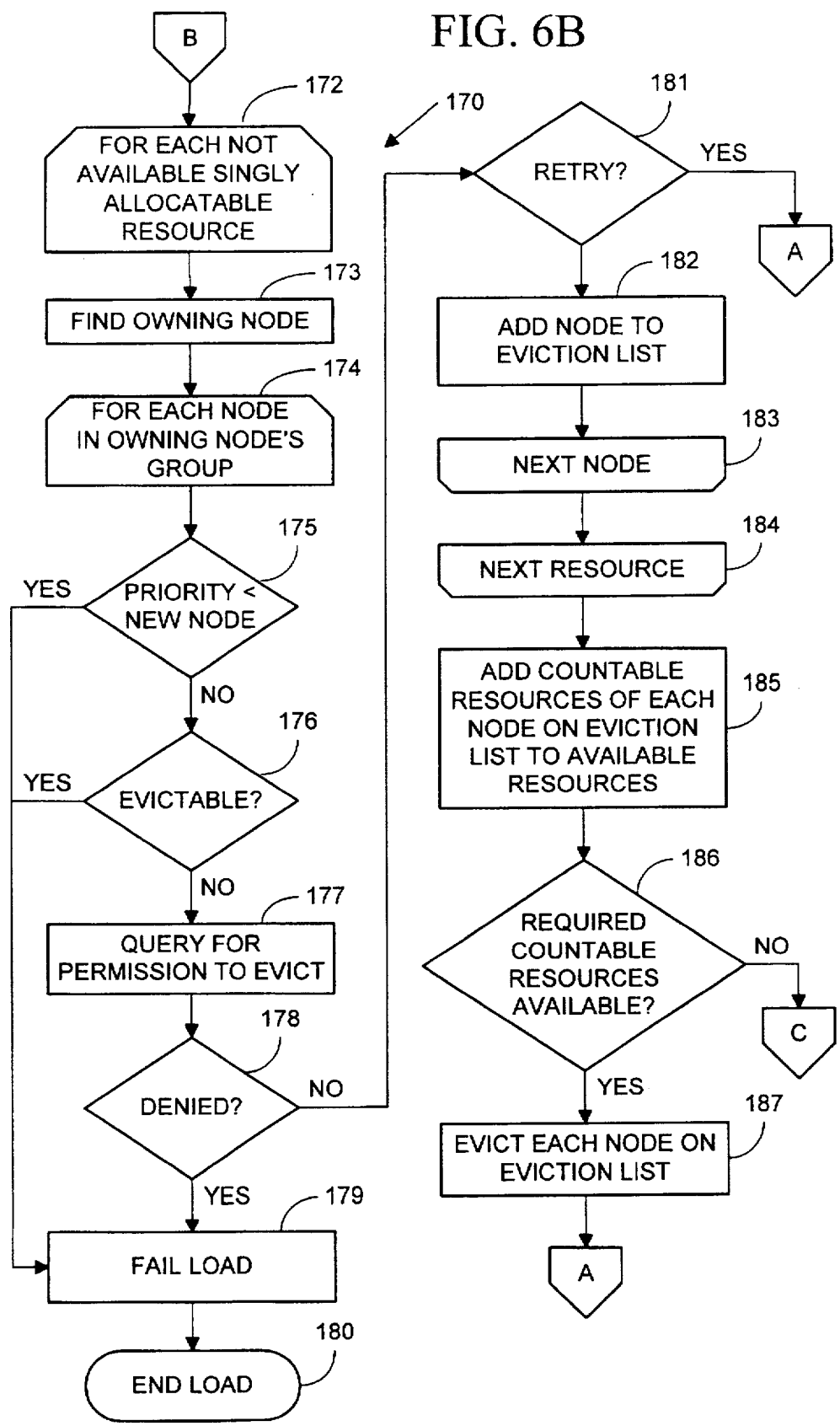
Figure 6C:
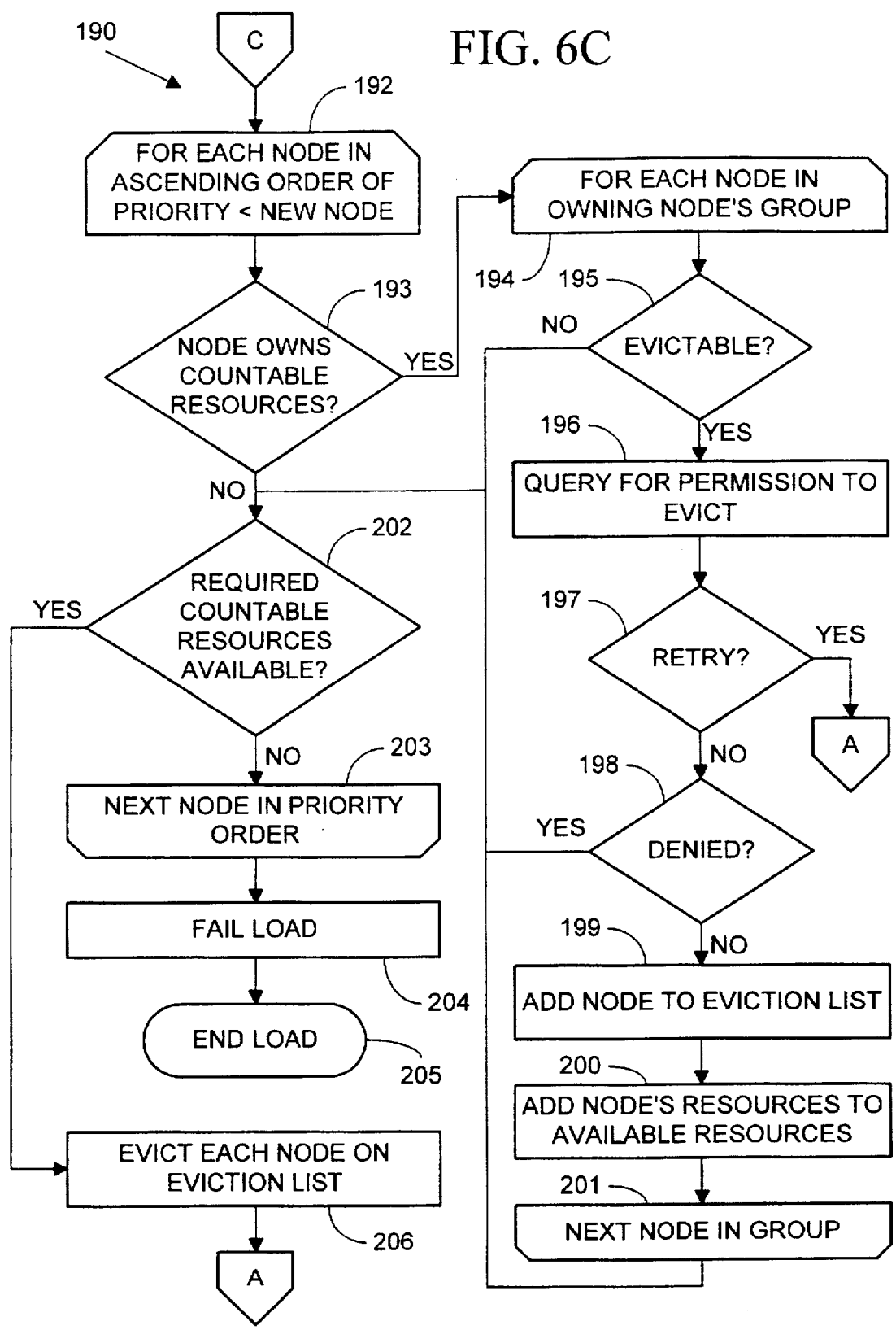

FIGS. 6A, 6B, and 6C are a flow chart of a prioritized co-processor resource management method 160 according to the preferred embodiment of the invention, which is utilized in PCRM 110 (FIG. 4). With method 160, PCRM 110 allocates co-processor resources to nodes for requested operations according to the user's prioritization of the service classes of the requested operations. A pseudo-code listing implementing method 160 is shown in the following Table 1.

TABLE 1

Pseudo-Code Listing of Prioritized
Co-processor Resource Management Method.

Get the available platform resources
If the new node requires a currently unavailable singly
allocatable resource
    While we can locate a node which uses a required
    singly allocatable resource
        For every node in the group containing this node
            If priority is same or higher than new node's
                Exit: cannot resolve resource conflict
            If that node is not evictable
                Exit: cannot resolve resource conflict
            Query client and platform for permission to TABLE 1-continued Pseudo-Code Listing of Prioritized
Co-processor Resource Management Method.

evict
    If client or platform deny permission
        Exit: cannot resolve resource conflict
    If client or platform request a retry
        Exit: load should be re-attempted
    Save identity of potentially evictable node
For each potentially evictable node identified above
    Add its countable resources to the available resources
If new node requires more of a countable resource than
available
    For each node, from lowest priority to one less than
    that of the new node
        If freeing the node would free up a desired
        resource
            For each node in the same group
                If that node is not evictable
                      Skip all nodes in this group
                Else
                      Query client and platform to evict
                      If client or platform request a retry
                          Exit: load should be re-attempted
                      If client or platform give permission
                          Save identity of potentially evictable
                          node
                          Add its resources to the available
                          resources
                Else
                    Skip all nodes in this group
        If available resources now enough
            Stop looking for more
If available resources now enough
    For each potentially evictable node
        Evict the node
    Exit: load should be re-attempted
Else
    Exit: cannot resolve resource conflict Method 160 begins at step 162 when DSPRM 100 (FIG. 4) receives a request from any of device drivers 98 to load and execute a new group of one or more nodes (hereafter the "new node") for an operation on DSP platform 94 (FIGS. 4 and 5). Before the new node can be loaded, PCRM 110 must allocate resources sufficient to execute the new node. PCRM 110 first determines whether loading the new node would create a conflict for resources in steps 163–165.

At step 163, PCRM 110 queries DSP platform 94 for information on the availability of resources. DSP platform 94 responds by returning a resource data structure indicating the available resources. As described above, the resource data structure contains a flag for each singly allocatable resource indicating whether or not the resource is available (i.e. not currently allocated), and a count for each countable resource indicating the quantity of the resource which remains available. Each flag that is set indicates that the corresponding singly allocatable resource is currently allocated, and thus unavailable.

At step 164, PCRM 110 also queries DSP platform 94 for information on the resource requirements of the new node. DSP platform 94 again responds by returning a resource data structure. This time, however, the flags and counts of the resource data structure indicate the requirements of the new node for each singly allocatable and countable resource, respectively. Each flag that is set indicates its corresponding singly allocatable resource is required by the new node. Each non-zero count indicates a quantity of its corresponding countable resource that is required by the new node.

At step 165, PCRM 110 compares the two resource data structures to determine if sufficient resources are available to meet the resource requirements of the new node. Each flag that is set in both resource data structures indicates that a conflict exists for the corresponding singly allocatable resource. Each count which is less in the available resources' data structure than in the new node's resource requirements' data structure indicates that a conflict exists for the corresponding countable resource.

If PCRM 110 determines at step 165 that no resources conflicts exist, PCRM 110 proceeds to allocate resources to the new node at step 166. PCRM 110 signals DSP platform driver 120 that the new node is to be loaded and executed. If the new node (or any of its component nodes) is a processing task, dynamic task loader 130 (FIG. 5) in DSP platform driver 120 then loads the code and data for the processing task into RAM memory 58 (FIG. 2) of the DSP adapter 50. Task scheduler 142 (FIG. 5) in DSP operating system 124 will then begin scheduling the processing task to execute on DSP 54 (FIG. 2). If the new node (or any of its component nodes) is a device, device controller 136 (FIG. 5) of platform driver 120 directs the device to implement the node. Resource tracker 132 in platform driver 120 also records that the required resources of the new node are in use and no longer available, until execution of the new node is completed or otherwise terminates. Method 160 then ends at step 167.

If, however, PCRM 110 determines at step 165 that any resource conflicts exist, the new node cannot be allocated unless sufficient required resources which are currently allocated to nodes having a lower priority can be freed. The PCRM's attempt to free resources for the new node is done in two stages 170 (FIG. 6B) and 190 (FIG. 6C). PCRM 110 first analyzes in steps 172–187 (FIG. 6B) any resource conflicts for singly allocatable resources, before analyzing conflicts for countable resources in steps 192–206 (FIG. 6C). This two stage approach typically is more efficient. Any unavailable singly allocatable resources required by the new node must be freed from the node to which it is currently allocated, or the allocation can not be made. Accordingly, when conflicts for singly allocatable resources cannot be resolved, PCRM 110 can fail allocation of the new node without further analysis.

In stage 170 (FIG. 6B), PCRM 110 identifies nodes which, if freed, will release singly allocatable resources required by the new node. As indicated at step 172, PCRM 110 repeats an outer loop of steps 172–184 for each singly allocatable resource which is in conflict (i.e. required by the new node, but unavailable). At step 173 in each iteration of outer loop 172–184, PCRM 110 finds the singly allocatable resource's owning node (i.e the currently executing node to which the singly allocatable resource already has been allocated). The owning node for each unavailable singly allocatable resource can be found, for example, by comparing the resource requirements of each currently executing node to those of the new node. Alternatively, the singly allocatable resource flags in the new node's resource requirements data structure can be traversed. For each flag that is set in both the resource requirements and available resources data structures, resource tracker 132 (FIG. 5) is queried for the owning node's identity.

As indicated at step 174, PCRM 110 then repeats an inner loop of steps 147–183 to determine if the owning node can be evicted so as to free the conflicted singly allocatable resource for allocation to the new node. In inner loop 147–183, PCRM 110 analyzes each node (hereafter the "subject node" in a particular iteration of inner loop 147–183) in a group containing the owning node found at step 173 of outer loop 172–184 (including the owning node itself) to assess the owning node's evictibility status.

At step 175 in each iteration of the inner loop 174–183, PCRM 110 compares the priority of the inner loop iteration's subject node to that of the new node. The nodes' relative priorities for eviction purposes are determined with reference to their service class attribute. (The real time attribute, on the other hand, establishes two tiers of priority, "real time" and "not real time," for purposes of scheduling by task scheduler 142 (FIG. 5).) A subject node whose service class is ranked higher in order of priority by the user than that associated with the new node has priority over the new node for purposes of resource allocation. Accordingly, PCRM 110 fails to allocate resources to the new node when the owning node of a resource required by the new node, or any node in the owning node's group, has the same as or a higher priority than the new node. In such case, the resource conflict cannot be resolved because the owning node takes precedence over the new node. If, in any iteration of inner loop 174–183, the subject node is not lower in priority than the new node, PCRM 110 fails to load the new node at step 179, and ends method 160 at step 180.

When the subject node of inner loop 174–183 is lower in priority than the new node, PCRM 110 then examines the subject node's evictable attribute. Nodes which have been marked as "not evictable" are not subject to prioritized eviction by PCRM 110, and will not be evicted to free resources for the new node. Accordingly, PCRM 110 fails to allocate resources to the new node when the owning node of a resource required by the new node, or any node in the owning node's group, is marked as not evictable. In such case, the resource conflict cannot be resolved because the owning node is not subject to eviction. If, in any iteration of inner loop 174–183, the subject node is not evictable, PCRM 110 fails to load the new node at step 179, and ends method 160 at step 180.

Even when the subject node of inner loop 174–183 is marked as evictable, PCRM 110 also queries for permission to evict the subject node from the DSP platform 94 (FIG. 4) and the client device driver 98 (FIG. 4) which originally requested loading and execution of the subject node. This further query test for evictibility of the subject node allows the platform driver 120 (FIG. 5) or client device driver 98 to override eviction of the subject node. Additionally, through this query test, the platform driver 120 or client device driver 98 is given an opportunity to modify the subject node so as to reduce its resource requirements to avoid eviction. For example, the platform driver 120 or client device driver 98 could reduce the baud rate of a modem node from 9600 bps to 2400 bps, which may free enough resources for the new node without fully evicting the modem node.

The platform driver 120 and client device driver 98 can respond to the query test by accepting eviction of the subject node, denying permission to evict, or requesting a retry. As shown at step 178, if the platform driver 120 or client device driver 98 deny permission to evict, the resource conflict cannot be resolved because the owning node is not evictable. Accordingly, PCRM 110 fails to allocate resources to the new node at step 179, and ends method 160 at step 180. If, as shown at step 181 however, the platform driver 120 or client device driver 98 respond to the query test by requesting a retry, PCRM 110 begins method 160 anew at step 163. Otherwise, if platform driver 120 and client device driver 98 consent to the eviction, PCRM 110 adds the subject node to an eviction list of nodes that potentially can be evicted to meet the new node's resource requirements.

At step 183, inner loop 174–183 is repeated for the next node in the owning node's group until all nodes in the group are assessed for evictibility. At step 184, outer loop 172–184 likewise is repeated for the next unavailable singly allocatable resource required by the new node until the resource conflict of each such resource is resolved. At the successful completion of these loops (i.e. without exiting to steps 179-180 due to non-evictibility of an owning node or to step 163 for a retry), PCRM 110 has accumulated an eviction list of nodes which can be evicted to resolve the new node's conflicts for singly allocatable resources.

When the nodes on the eviction list are evicted to free the singly allocated resources required by the new node, the countable resources of these nodes also will be freed. Analysis of countable resource conflicts therefore can be avoided if evicting the nodes on the eviction list also frees sufficient countable resources to meet the new node's countable resource requirements. Consequently, PCRM 110 first determines whether the addition of the countable resources of the nodes on the eviction list to the available resources also results in sufficient countable resources being available for allocation to the new node. As shown at step 185, PCRM 110 adds the countable resources currently allocated to the nodes on the eviction list to the available resources. At step 186, PCRM 110 compares this sum to the new node's resource requirements. If the comparison shows that sufficient resources would be made available to meet the new node's countable resource requirements by evicting these nodes, PCRM 110 evicts all nodes in the eviction list at step 187, and returns to step 163 (FIG. 6A). Sufficient resources should now be free to meet the new node's resource requirements due to the evictions. Steps 163-166 therefore result in allocation of resources to the new node. If, however, PCRM 110 determines at step 186 that additional countable resources are still needed, PCRM 110 proceeds to analyze countable resource conflicts in second stage 190 (FIG. 6C) of method 160.

In second stage 190, PCRM 110 attempts to resolve the new node's remaining countable resource conflicts by identifying nodes of lower priority than the new node that can be evicted to free needed countable resources. As indicated at step 192, PCRM 110 repeats an outer loop of step 192-203 which traverses the nodes 146 (FIG. 5) currently executing on DSP platform 94 (FIGS. 4 and 5) in ascending order of priority lower than the new node, i.e. from the currently executing node having the least priority to the currently executing node next lower in priority to the new node. In each iteration of loop 192-203, PCRM 110 determines whether evicting the next node in the ascending priority order would free needed countable resources, and whether that node is evictable.

At step 193, PCRM 110 determines whether the next currently executing node in the ascending priority order (hereafter lower priority node) is currently using any countable resources for which the new node has a conflict. PCRM 110 obtains a resource data structure indicating which resources are allocated to this lower priority node from resource tracker 132 (FIG. 5), and compares it to the new node's resource requirements data structure. If this comparison shows that the lower priority node currently uses any countable resources for which the new node still has a conflict (i.e. the lower priority node is an owning node), PCRM 110 performs an inner loop of steps 194-201 to determine whether such owning node can be evicted to free its resources. Otherwise, if evicting the lower priority node would not free needed countable resources, PCRM 110 continues to steps 202-203 (which result in repeating outer loop 192-203, or if no other currently executing nodes are lower in priority than the new node completing outer loop 192-203 as described below).

Steps 194-201 form an inner loop in which PCRM 110 determines whether the owning node identified at step 193 can be evicted to free its resources for the new node's use. To assess the evictability of the owning node, PCRM 110 repeats inner loop 194-201 for each node (hereafter the subject node in a particular iteration of inner loop 194-201) in a group containing the owning node.

At step 195 of inner loop 194-201, PCRM 110 examines the subject node's (of the current inner loop iteration) evictable attribute. Again, as described above, nodes which have been marked as "not evictable" are not subject to prioritized eviction by PCRM 110, and will not be evicted to free resources for the new node. Further, nodes which are grouped with a non-evictable node also are not evicted. Accordingly, if the subject node is marked as not evictable, PCRM 110 skips all nodes in the group, and exits from inner loop 194-201. Unlike step 175 (FIG. 6B) however, PCRM 110 does not end the analysis of countable resource conflicts when the owning node is not evictable, because portions of the same countable resource can be allocated to many of the currently executing nodes 146 (FIG. 5). The new node's countable resource conflict therefore can still be resolved if another lower priority owning node exists which is evictable. PCRM 110 therefore simply continues to step 202 of outer loop 192-204 on exiting inner loop 194-201 from step 195.

As indicated at steps 196, when the subject node is marked as evictable, PCRM 110 also queries for permission to evict the subject node from the DSP platform 94 (FIG. 4) and the client device driver 98 (FIG. 4) which originally requested loading and execution of the subject node. As described previously, the platform driver 120 and client device driver 98 can respond to the query test by accepting eviction of the subject node, denying permission to evict, or requesting a retry. If, as shown at step 197, the platform driver 120 or client device driver 98 respond to the permission query by requesting a retry, PCRM 110 begins method 160 anew at step 163. As shown at step 198, if the platform driver 120 or client device driver 98 deny permission to evict, none of the nodes in the subject node's group can be evicted. PCRM 110 then skips all nodes in the group, and exits from inner loop 194-201. Again, PCRM 110 continues at step 202 of outer loop 192-204 on exiting inner loop 194-201.

Otherwise, if platform driver 120 and client device driver 98 consent to the eviction, PCRM 110 adds the subject node to an eviction list of nodes that potentially can be evicted to meet the new node's resource requirements at step 199. PCRM 110 also adds the subject node's resources to the available resources at step 200. At step 201, inner loop 194-201 is repeated for the next node in the owning node's group until all nodes in the group are assessed for evictability. After completion of inner loop 194-201, PCRM 110 continues outer loop 192-203 at step 202.

At step 202, PCRM 110 again compares the new node's resource requirements to the available countable resources (which have been summed with the countable resources of potentially evictable nodes at steps 185 and 200). If the comparison shows that the new node's countable resource conflict still has not been resolved, PCRM 110 repeats outer loop 192-203 for the next currently executing node 146 (FIG. 5) in the ascending priority order lower than the new node as shown at step 203. When all nodes lower in priority than the new node have been analyzed at step 203 (completing outer loop 192-203) without resolving the new node's countable resource conflict, PCRM 110 will be unable to allocate the required resources for the new node. PCRM 110 then fails the allocation at step 204, and end method 160.

On the other hand, if the comparison at step 202 shows that sufficient resources would be made available to meet the new node's countable resource requirements by evicting the nodes now on the eviction, PCRM 110 evicts all nodes in the eviction list at step 206, and returns to step 163 (FIG. 6A). Sufficient resources should now be free to meet the new node's resource requirements due to the evictions. Steps 163-166 therefore result in allocation of resources to the new node.

Having described and illustrated the principles of our invention with reference to a preferred embodiment, it will be recognized that the preferred embodiment can be modified in arrangement and detail without departing from such principles. For example, elements of the preferred embodiment shown in software may be implemented in hardware and vice versa.

Further, although illustrated with application to programmable, multi-tasking digital signal processing co-processors, the co-processor resource manager of the invention may be adapted to control resource allocation of single-tasking and dedicated DSPs and other co-processors to processing tasks, as well as resource allocation of host processor resources to specialized operations including digital signal processing.

Additionally, in alternative embodiments of the invention, the prioritized co-processor resource management method 160 (FIGS. 6A, 6B, and 6C) can be modified to identify an efficient mix of nodes to be freed, not just the lowest priority evictable nodes. For example, when the new node requires countable resources in conflict with a least priority and a next least priority evictable nodes of lower priority than the new node, PCRM 110 in the illustrated method 160 will evict both the least and next least priority nodes if evicting the least priority node does not yield sufficient countable resources to resolve the conflict. If the next least priority node has more of the countable resource in conflict, however, the conflict may be resolvable by evicting only the next least priority node rather than both of the least and next least priority nodes. To identify a more efficient mix of nodes to be freed such as in the example just given, a prioritized co-processor resource management method according to an alternative embodiment of the invention further analyzes combinations of lower priority nodes which own resources in conflict with the new node.

Having described and illustrated the principles of our invention with reference to a preferred embodiment, it will be recognized that the preferred embodiment can be modified in arrangement and detail without departing from such principles. For example, elements of the preferred embodiment shown in software may be implemented in hardware and vice versa.

Further, the principles of the invention can be applied to host resource management of a "virtual" co-processor, such as one that is emulated by a single host processor as a separate application or task in a multi-tasking operating system (sometimes referred to as "native" processing).

In view of the many possible embodiments to which the principles of our invention may be applied, it should be recognized that the detailed embodiments are illustrative only and should not be taken as limiting the scope of our invention. Rather, we claim as our invention all such embodiments as may come within the scope and spirit of the following claims and equivalents thereto.

We claim:

1. A computer system, comprising:
 a host processor executing a plurality of applications;
 a slave processor having a plurality of resources for performing operations requested by the applications, the slave processor having a multi-tasking operating system for controlling execution of a group of tasks loaded on the slave processor by the host processor; and
 a slave processor resource manager in communication with the applications to receive requests from the applications to perform operations at associated priority rankings in a priority order using the slave processor, the operations being implemented in groups of one or more nodes, the nodes comprising tasks executable on the slave processor, the nodes being associated with resource requirements, and the slave processor resource manager being operative to allocate resources of the slave processor to perform the requested operations according to the priority ranking associated with the requested operations and resource requirements of the nodes implementing the operations, the allocation of resources by the slave processor resource manager controlling the nodes of which of the requested operations are loaded to execute on the slave processor.

2. The computer system of claim 1, comprising:
 a user interface control for ranking the operations according to a user-selected order of priority responsive to user input.

3. The computer system of claim 2 wherein the slave processor is a digital signal processor.

4. The computer system of claim 1 wherein the slave processor resource manager is operative, responsive to an application's request to perform an operation having a first priority on the slave processor, to terminate one or more operations currently being performed on the slave processor which have lower priorities than the requested operation.

5. A manager of co-processor resources for a computer system having a host processor and one or more slave co-processors, comprising:
 a multi-tasking host operating system for controlling execution of a plurality of application threads on the host processor;
 a co-processing platform driver for controlling loading of any of a plurality of nodes implementing various operations to execute on the one or more slave co-processors, the nodes utilizing resources of the slave co-processors and comprising tasks executable on the slave co-processors;
 a plurality of device drivers having services callable through application programming interfaces by the application threads for requesting operations performable on the co-processing platform driver, the device drivers associating the operations with a plurality of service classes ranked in order of priority; and
 a co-processor resource manager in communication with the device drivers and co-processing platform driver and operative to allocate resources of the one or more slave co-processors to the nodes which implement the operations requested of the device drivers by the application threads to thereby control which of the nodes are loaded by the co-processing platform driver to execute on the slave co-processors, the nodes being assigned the priority associated with the operations that they respectively implement; and
 the co-processor resource manager being operative when resource allocation requirements of a node for a requested operation cannot be met from any available resources not yet allocated to nodes currently executing on the one or more slave co-processors, to terminate one or more currently executing nodes which can be evicted, which have a lower priority than the node for the requested operation, and which collectively have been allocated sufficient resources that added to the available resources meet the allocation requirements of the node for the requested operation, so that the co-processor resource manager can thereafter allocate resources sufficient to fulfill the allocation requirements to the node for the requested operation, the terminated nodes being unloaded from executing on the slave co-processors.

6. The manager of claim 5 comprising:

the co-processor resource manager being operative to query a client device driver of a currently executing node for permission to evict said currently executing node.

7. The manager of claim 6 wherein the co-processor resource manager is further operative to query the co-processing platform driver for permission to evict a currently executing node.

8. The manager of claim 5 comprising:

the co-processor resource manager being operative to query the co-processing platform driver for data relating to the resource allocation requirements of a node and for data relating to the available resources.

9. The manager of claim 8 comprising:

the co-processing platform driver being operative to represent the resources of the one or more slave co-processors as a plurality of singly allocatable resources and a plurality of countable resources in the data relating to the resource allocation requirements of a node and the data relating to the available resources; and the co-processor resource manager being operative to compare the data relating to the resource allocation requirements of a node to the data relating to the available resources to determine whether the resource allocation requirements of a node can be met from the available resources.

10. The manager of claim 5 comprising:

the co-processing platform driver being operative to label nodes currently executing on the one or more co-processors as non-evictable; and the co-processor resource manager being operative to exclude nodes labelled as non-evictable from termination.

11. A method for management of co-processor resources in a multi-tasking operating system for a computer having a host processor and a co-processor platform, the co-processor platform having a plurality of co-processor resources for performing operations, the method comprising:

ranking a plurality of service classes in order of priority;

executing a plurality of applications on the host processor, the applications requesting operations in one or more of the service classes, the operations being performable on the co-processor platform;

responsive to each request of an application to perform one of the operations, allocating co-processor resources to load a group of one or more nodes implementing the requested operation for execution on the co-processor according to the priority ranking of the service class to which the requested operation belongs.

12. The method of claim 11 wherein the step of allocating co-processor resources to the group comprising:

determining resource allocation requirements for the group;

identifying any available co-processor resources not yet allocated to nodes currently being executed on the co-processor platform;

determining whether the available co-processor resources are sufficient to fill the resource allocation requirements of the group;

if the available co-processor resources are insufficient to fill the resource allocation requirements of the group, adding co-processor resources allocated to currently executing nodes for operations having lower priority service classes than the requested operation to the available resources, and, when the available co-processor resources are sufficient to fill the resource allocation requirements of the group, terminating such nodes; and when the available co-processor resources are sufficient to fill the resource allocation requirements of the group, allocating co-processor resources filling the resource allocation requirements to load the group for execution on the co-processor platform.

13. The method of claim 12 comprising:

labelling one or more nodes as being non-evictable;

excluding nodes labelled as non-evictable from being terminated.

14. The method of claim 13 comprising excluding any node in a group containing a node labelled as non-evictable from being terminated.

15. The method of claim 12 comprising:

querying an application which requested an operation implemented by a currently executing node for permission to evict the node; and if permission to evict the node is denied by the application, excluding such node from being terminated.

16. The method of claim 15 comprising:

classifying a first plurality of the co-processor resources as singly allocatable;

classifying a second plurality of the co-processor resources as countable; and adding co-processor resources of currently executing nodes for operations having lower priority service classes than the requested operation to the available co-processor resources beginning with currently executed nodes which have been allocated singly allocatable co-processor resources included in the resource allocation requirements of the group, then in reverse order of service class priority of their operations.

17. A computer-readable medium having computer-executable instructions thereon for performing the steps recited in claim 15.

18. The method of claim 12 comprising:

decreasing the resource allocation requirements of a currently executing node for an operation having a lower priority service class than the requested operation to free one or more co-processor resources; and adding the freed co-processor resources to the available co-processor resources.

19. A computer-readable medium having computer-executable instructions thereon for performing the steps recited in claim 12.

20. A computer-readable medium having computer-executable instructions thereon for performing the steps recited in claim 11.

21. In a computer system having a host processor for executing a plurality of applications and a co-processor for performing operations requested by the applications in association with service classes, the co-processor having a plurality of resources for performing the operations, a co-processor resource manager comprising:

- a node library for associating resource requirements to nodes, the nodes comprising tasks executable on the co-processor;
- a service class ranking user interface for ordering service classes responsive to user input in a user-selected priority ranking;
- a resource allocator for allocating co-processor resources to a group of one or more nodes implementing the requested operations according to the priority ranking of the service class to which the requested operations belong; and
- a host-based co-processor task loader for loading tasks to execute on the co-processor responsive to the resource allocator allocating sufficient co-processor resources to meet the resource requirements of the node, whereby the allocation of co-processor resources according to the priority ranking controls which of the nodes are loaded to execute on the co-processor.

* * * * *